Jan. 20, 1970  R. F. BRACKIN  3,490,622
VAN HANDLER VEHICLE
Filed Feb. 26, 1968  6 Sheets-Sheet 6

INVENTOR.
RICHARD F. BRACKIN
BY
*Teagno & Todd*
ATTORNEYS

United States Patent Office 3,490,622
Patented Jan. 20, 1970

3,490,622
VAN HANDLER VEHICLE
Richard F. Brackin, Holland, Pa., assignor to Eaton Yale & Towne Inc., Cleveland, Ohio, a corporation of Ohio
Filed Feb. 26, 1968, Ser. No. 708,264
Int. Cl. B60p 1/46; B65g 67/02; B66f 9/06
U.S. Cl. 214—38
21 Claims

ABSTRACT OF THE DISCLOSURE

A vehicle for handling huge containers or vans with a load engaging means mounted on a longitudinal beam for linearly moving an engaged load to or from either side of the chassis to a central position within the confines of the chassis and powered means for elevating and lowering the load engaging means and its support. Thus, a van may be picked up or deposited at a position on one side or the other of the chassis with the van transported by the vehicle in a central position.

---

This invention relates to an industrial truck to be utilized in the handling of loads now handled by a truck of that type known as a straddle truck. Trucks of this class are very old in the art, and are used for handling extremely large loads such as containers or vans. Straddle trucks are also used to handle loads such as piled lumber. A straddle truck generally comprises a large frame with four wheels, two at each side and at each end. The truck is moved endwise relatively to a load such as a van, to a point where it straddles the van. Lifting means are then applied to the van, the van is lifted off the ground, and then with the van in straddled position, the truck moves off to a warehouse or storage yard where the van is deposited.

The handling of huge containers or vans is becoming increasingly popular and ships, warehouses, storage yards, railroads, and other transport facilities are being adapted for the handling of containers. The containers or vans are generally 20 to 40 feet long and 8 to 10 feet in height and width. Much thought has been given during the last few years to the creation of more efficient and effective straddle trucks. The vehicle or truck of my invention, which I prefer to call a van handler, makes a very considerable contribution to the art as will be apparent from a reading of the specification that follows.

In order to appreciate one contribution of my invention, it is important to consider the following situation. A series of vans are mounted on a series of railroad cars coupled end to end. In order to remove the vans, it is necessary for the straddle truck to straddle the end railroad car, and if the end car is carrying a van, to remove that van by lifting it, while straddling the van. The straddle truck now moves endwise off the railroad car to the place where the van is to be stored. The straddle truck must then, after depositing the van, move into straddling relation to the second railroad car carrying a second van, and to do this it must straddle the first car. Thereafter, the straddle truck must move back off the two cars, carrying the second van to a position where it is deposited. This straddling operation becomes more and more complex, and more difficult as the straddle truck must straddle more and more freight cars.

As a feature of my invention, I make it possible for my van handler truck to move to the side of a freight car, pick up the van off the freight car and then shift it inwardly of the truck into straddled position. My truck is then capable of moving away from the series of flat cars with the van straddled so that transporting is relatively simple. It is obvious that the procedure followed by my van handler in unloading a train is far more simple than that involved when using a conventional straddle truck.

In order to appreciate further the value of my invention, it is necessary to note that when a conventional straddle truck lifts a van, the van is held lifted in an elevated position and is in that position relatively to the straddle truck as the straddle truck transports the van. Because the van is held elevated by the lifting mechanism rather than deposited on a part of the truck, a great strain is naturally placed on the lifting mechanism. Therefore, the speed of movement of the straddle truck must necessarily be rather slow in order not to damage the van or the lifting mechanism. In some trucks of this type, it may be possible to lower the load for support on a part of the truck chassis. However, any supports for the load will present an obstruction to the use of the truck for straddling a load as the supports will not allow straddling movement.

As a feature of my invention, once the van is moved off the train into straddled relation to the van handler, it may be lowered on to support means of the van handler. Thereafter, the van may be moved readily by the truck at a comparatively high speed without fear of damage.

In order further to appreciate my contribution to the art, let us consider that a conventional straddle truck has straddled a load and elevated it. It is now necessary to place the load on a truck or a flat car of a train for support. The straddle truck must now straddle the flat car of the train or any other truck that is to be used for transport, and deposit the load thereon. As a feature of my invention, the straddled load may at any time be moved to one side or the other of the van handler and then be lowered on to a flat car or truck, as may be desired. This feature is particularly desirable when a load is to be transferred directly from a transporting truck or from any storage position to a flat car, or vice versa. My van handler can be placed in position between the flat car and the transporting truck and will readily shift the load from one to the other. If it is impossible to place the transporting truck adjacent to the flat car or to a storage position on which the load must be deposited, then the load may be shifted into straddled relation to the van handler, transported where desired, and there deposited.

Of course, it will further be appreciated that my van handler is capable of lifting a load without being required to straddle the load, and this is of particular importance where a load is so positioned that it simply cannot be straddled. Particularly, this feature is desirable in the unloading of ships that are not docked. A truck equipped as conceived by me, and having suitable power means operable under water, can be placed alongside a vessel and will unload the vessel.

In order to further appreciate the utility of this invention, let us consider that it is desired to remove a special container from a flat car in the center of a long train of flat cars each loaded with a container. A conventional straddle truck would have to straddle the cars of the train until it was finally positioned over the special container. This container would be elevated and then the straddle truck, with the container elevated, would move out of straddling relation to the considerable number of cars it has straddled in order to reach the special container. Utilizing the van handler truck of my invention, it is merely necessary to place the truck at one side of the special container, elevate it from the flat car, and then shift it laterally into a straddled position within the truck for transport, or continuously to the other side of the truck for deposit on to a transport truck for transport to a customer or storage area. Again, the great utility and versatility of my invention is made rather clear.

It has been proposed that large containers or vans be shifted by a van handler utilizing cranes. Thus, the van handler truck will have one or a pair of cranes that may swing so as to accept a load at one side of the van handler truck, and then shift the van to the other side, where it may be deposited on a flat car or load truck, or a storage position. Conceivably, if the van handler truck is sufficiently large, the crane mechanism will function effectively, and there may even be room for placing the van on the truck chassis for transport. However, cranes require a considerable amount of space, and further, must necessarily be of rather considerable height in order that the swinging movement of the cranes be adequate for the manipulation of the load. Those skilled in the art will readily appreciate that the height of the cranes is so very great as compared to the van size, that the van handler can only be utilized in a very limited fashion, and can definitely not be available for moving a van or other container into a warehouse or out of a warehouse, or as a matter of fact, into or out of any area where there is not a tremendous amount of head room. It is also incapable of road transportation, except when the cranes are allowed to collapse into a stored position, and then there is no room for carrying the van.

As a feature of my invention whereby it is possible to accomplish what I have outlined, I utilize a truck having a wheeled chassis with load engaging means for engaging a load such as a van, the load engaging means being mounted and supported by mounting means that make it possible for the load engaging means to move between one longitudinal side or the other of the chassis for picking up a load that is positioned outside the chassis. Power means are provided for lifting and lowering the mounting means together with the load engaging means, preferably in all positions thereof. Therefore, once the load is engaged, the power means will lift and lower the load as though it were an integral part of the mounting means. This makes it possible, quite naturally, for the mounting means to lie in close juxtaposition to the load, where that is necessary, so that the vehicle will not have high silhouette that is inherent in crane trucks.

As a particular feature of this part of the invention, the load engaging means are moved on the mounting means transversely of the truck chassis and preferably in a linear path, this being possible through utilization of the concept of my invention. Further, the power means move also in a linear path that is vertical, and again, this is made possible through the concept of my invention. The advantages relatively to cranes in which swinging movement is utilized will be apparent.

As a particular feature of my invention, means are provided on the chassis so that when the load is moved transversely from one side of the chassis to a position centrally thereof, it may be deposited on support means so as to become a part of the chassis and to be thereafter movable with the chassis. As was earlier outlined, this in itself is a very considerable contribution to the art because it prevents the swinging movement of the load or its shifting as the load is being transported with the chassis.

As a further particular feature of the invention, which will be clear from what has been earlier set forth, the load may be transferred immediately from one side of the chassis to the other side, or from a central position to a side of the chassis other than the one from which it was moved to the central position in the chassis.

More in detail, I utilize a load elevating assembly that extends longitudinally of the chassis and is preferably lifted bodily relatively to the chassis by lifting means which preferably but not necessarily take the form of rams positioned in the longitudinal axis of the chassis at each end thereof.

As still a further feature of the invention, the means for elevating the load include beams or similar structures carried by the elevating means and adapted to support trolleys or similar devices for movement on the beams laterally of the chassis. As a still further feature of this portion of the invention, the beams may themselves be mounted for movement transversely of the chassis in order that a load may be positioned at one side or the other of the chassis without requiring extensive trolley movement.

A further feature of this part of the invention is the contribution of beams which are relatively narrow relatively to the chassis so as not to obstruct manipulation of the truck. In other words, each beam positioned transversely of the chassis may actually be no wider than the chassis, and may be moved transversely to a particular position, with the trolleys on the beams moving relatively to the beams and also while the beams are moving, so as to position the load to one side or the other of the chassis.

Even more particularly, I provide novel counterbalancing means which may be supported similarly to the load securing means mounted on the beams, by providing an additional pair of beams carrying the counterweights. Thus, while the two beams carrying the load move in one transverse direction relatively to the truck, the other pair of beams carrying the counterweights move in an opposed direction. This movement of the counterweights may be controlled manually or automatically.

As a further particular feature of the invention, my chassis is formed of two parts, each part being independently supported by ground wheels. The two parts are constructed so that they may be assembled to one another as through a telescopic connection, thereby making possible the shortening or the lengthening of the chassis as may be required by the lengths of the vans to be handled.

As a still further feature of this part of the invention, the load elevating means may also comprise telescopic members that are assembled to one another as the two chassis parts are assembled to one another. Obviously, this will not affect in any way the arrangement of the beams and trolleys carrying the counterweights and the load, nor the load lifting means or rams that lift the load elevating means.

As a further even more particular feature of the invention, I utilize a cab for carrying an operator, the cab being secured to the elevating mechanism for movement therewith. The operator will control the movement of the truck and the load lifting means through a remote control mechanism as will readily be apparent to those skilled in the art.

My invention contemplates also a modified form of counterbalancing means. Thus, I have conceived the utilization of a beam positioned longitudinally of the chassis and in the center thereof, this beam to be movable transversely of the chassis and in the center thereof, this beam to be movable transversely of the chassis from a central position to a position at the left side or the right side of the chassis. The beam will naturally lie at all times within the bounds of the chassis and will, therefore, not interfere with its movement, as between containers at each side.

I have thus outlined rather broadly the more important features of my invention in order that the detailed description thereof that follows may be better understood and in order that my contribution to the art may be better appreciated. There are additional features of my invention that will be described hereinafter and which will form the subject of the claims appended hereto. Those skilled in the art will appreciate that the concept on which my disclosure is based may readily be utilized as the basis for the design of other structures for carrying out the several purposes of my invention.

Referring now to the drawings.

Referring now more particularly to FIGURES 2 through 5 of the drawings, my truck consists of a wheeled chassis 10 at each end of which is mounted a powered lifting and lowering mechanism 11 for raising and lowering a mounting means 12. A pair of traversing means are secured to the mounting means 12 and support load engaging means 14.

The wheeled chassis 10 includes a front axle 15 and a rear axle 16 each supported respectively by a pair of front wheels 17 and a pair of rear wheels 18 which are suitably mounted for steering movement about a vertical steering axis. Since particular mounting and steering of the wheels comprises no part of my invention it need not be described in detail. The front axle 15 and rear axle 16 are connected by a lower longitudinal beam 19 each end of which provides a suitable support for a power source, or engines 20 and 21 which may drive the respective wheels 17 and 18 through any suitable drive means such as a direct drive gear train, a generator motor set or a hydrostatic drive.

Also mounted on the lower longitudinal beam 19 adjacent each of the axles 15 and 16 is a lifting mechanism 11 which comprises a stationary upright 22 having at least one and preferably several movable uprights 23 which are vertically extendible relative to the stationary upright and to each other. The movable uprights are powered by a suitable ram 24 for extending and retracting the movable uprights. The upper movable upright of each of the lifting mechanism 11 are connected to each other by an upper longitudinal beam 26 which is secured to the uprights by suitable brackets 27. Thus, the beam 26 provides a vertically movable mounting means for the traversing means 13.

The traversing means 13 includes a pair of U-shaped fixed rails 28 secured to the upper beam 26 by brackets 29. A movable rail 30 is provided with longitudinally spaced rollers 31 that engage the inner lower surface 32 of the fixed rail 28 as clearly shown in FIGURE 3. In similar fashion, a U-shaped trolley 33 is provided with rollers 34 which ride on the inner lower surface 35 of the rail 30 for longitudinal movement relative to the rail 30.

Any suitable load engaging means 14 may be secured to the trolley 33 and for purposes of illustration I have shown in the drawings a conventional van or container grapple 36 having a fixed transverse link 37 slightly longer than the width of the van V. At each end of link 37 is a pivotally mounted arm 38 provided with a shoe 39 so that as the arms are pivotally moved toward each other they may engage the lower edge of the van or container V.

The forward end of upper beam 26 supports an operator's cab or compartment 40 having the necessary controls for operating the van handler. A ladder 41 is provided on the compartment for engine 20 facilitating access to the cab 40.

Figure 6:
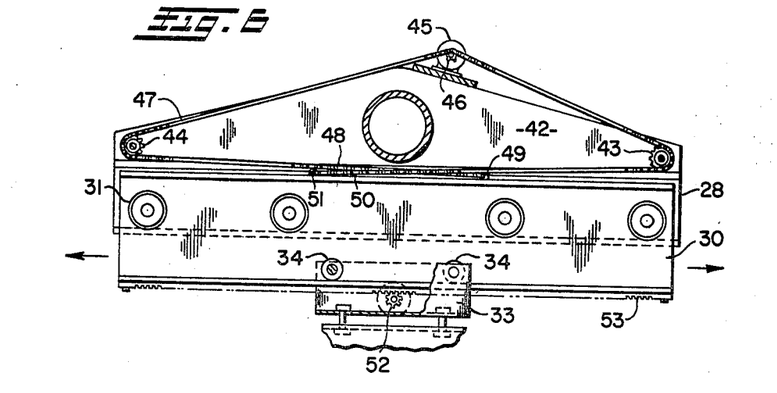
FIGURE 6 is a partial sectional view taken along the line 6—6 of FIGURE 5 with parts broken away showing the means for powering the mounting means of my invention.
Figure 6A:
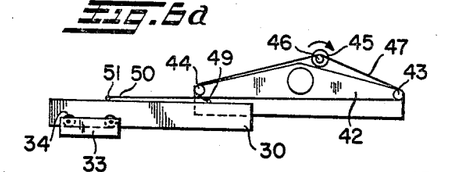
FIGURES 6a and 6b are schematic views similar to FIGURE 6.
Figure 6B:
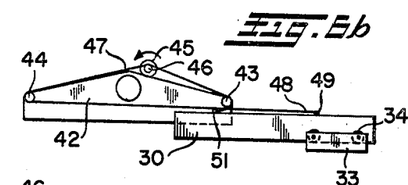
Figure 7:
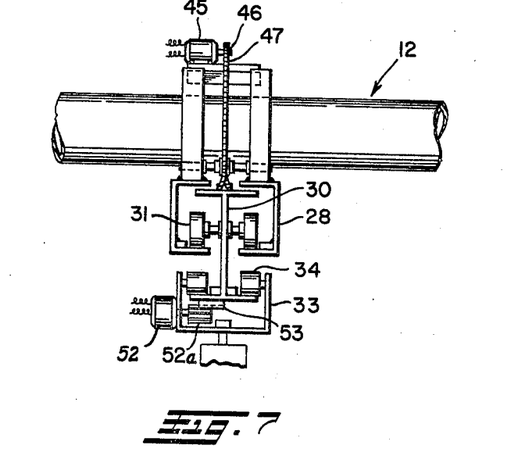
FIGURE 7 is an end view of FIGURE 6.

In FIGURES 6 and 7 of the drawings, I illustrate the mechanism for powering or moving the traversing means 13 linearly relative to the mounting means 12. Mounted on each of the brackets 29 is a plate 42 for supporting a pair of sprockets 43 and 44 and a motor 45 driving a sprocket 46. A length of chain 47 is reaved around the sprockets with one end 48 fixed to the movable rail 33 at 49 and the other end 50 of the chain secured at 51. The ends of the chain overlap each other as seen in FIGURE 6. Thus, when the motor 46 is driven to move the chain in a clockwise direction, the movable rail 30 is pulled via the chain end 48 into the position shown in FIGURE 6a. Conversely, when the motor 46 is driven in an opposite direction chain end 50 pulls the movable rail 30 into an opposite position as shown in FIGURE 6b of the drawings.

FIGURE 7 of the drawings illustrates a means for moving trolley 33 relative to the movable rail 30. Preferably, an electric motor 52 is mounted on the trolley 33 so that its drive pinion 52a meshes with a gear rack 53 fixed to the lower surface of the movable rail 33. The motor 52 when operated in one direction drives the trolley 33 relative to the movable rail 33 into a position as shown in FIGURE 6a and upon reversal of the motor 52 the trolley is driven relative to the movable rail 33 into a position as shown in FIGURE 6b.

Figure 4:
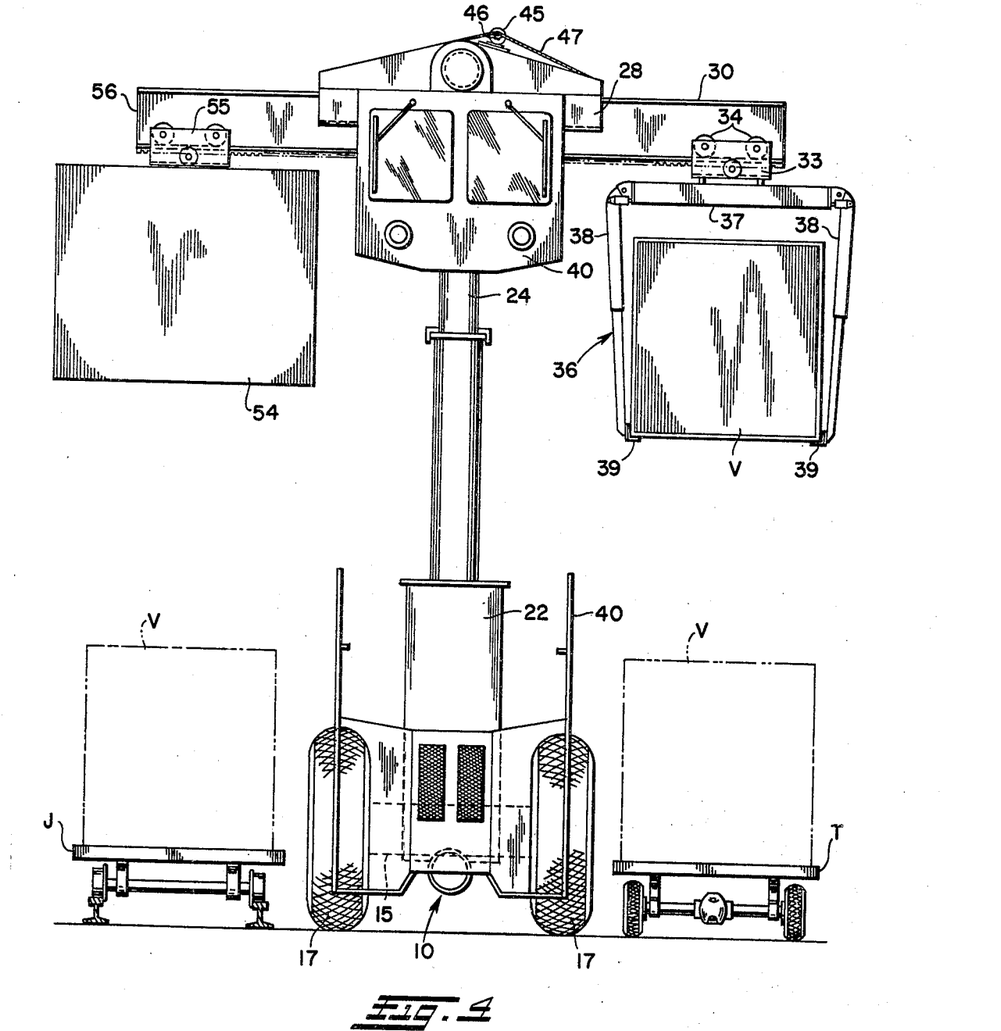
FIGURE 4 is a front elevational view of my van handler similar to FIGURE 2 but showing the operation of my movable counterweight.
Figure 5:
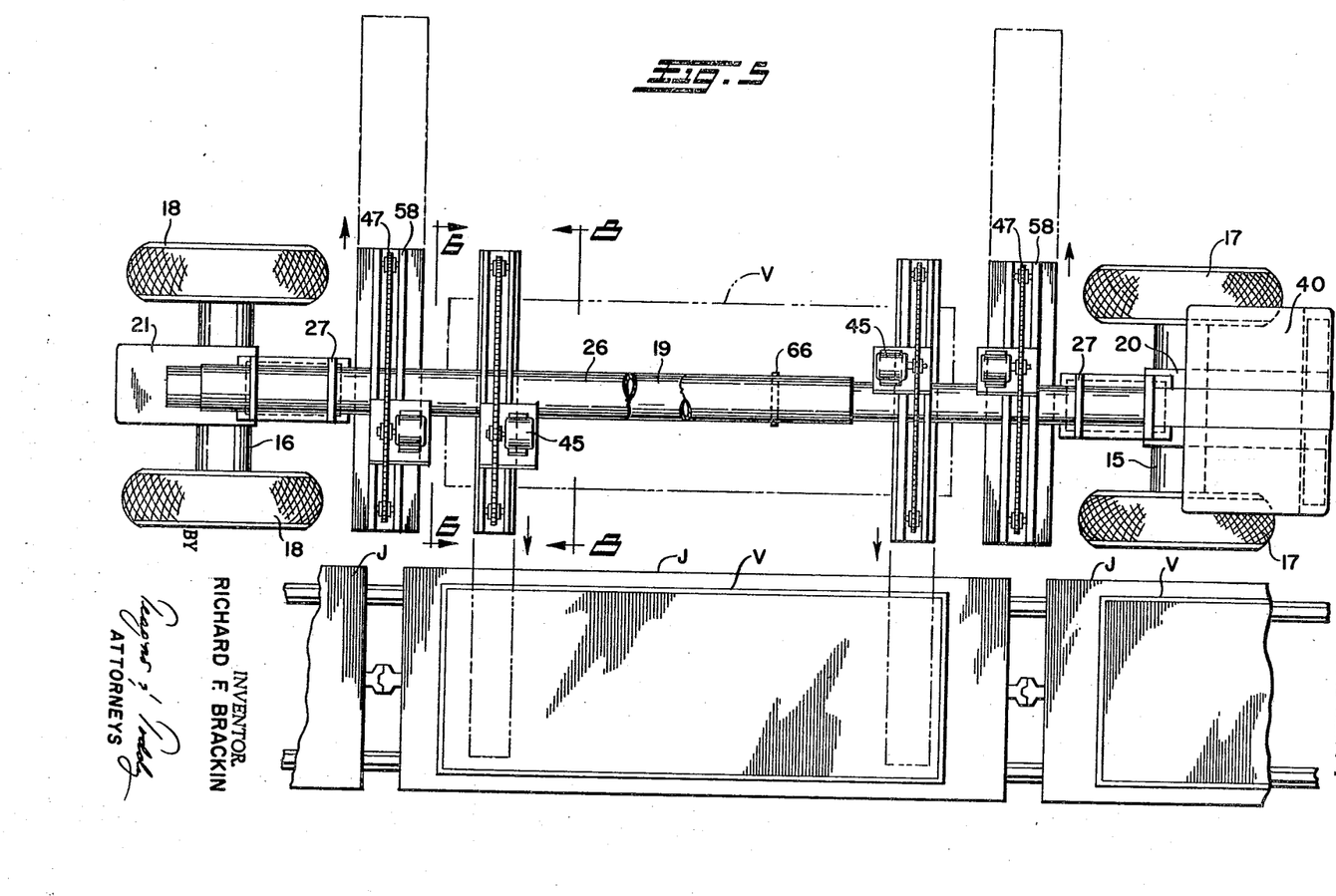
FIGURE 5 is a plan view of my van handler.

In certain modes of operation of my van handler, particularly when the van handler is operating in off-shore operations, I prefer to provide the truck handler with a pair of movable counterweights 54 positioned adjacent each of the lifting mechanisms 11 to provide for sufficient clearance between a van supported by the load engaging means 14. The counterweights 54 are supported on a carriage 55 suitably mounted for movement on rail 56 which in turn is suitably mounted for movement on fixed rails 57. The rails 57 are secured to the upper beam 26 by suitable brackets 58 with the carriage 55 being driven longitudinally relative to the movable rail 56 in the same manner as the trolley 33 of the load traversing means 13. Likewise, the movable rail 56 is movable relative to the fixed rail 57 in a like manner as the movable rail 30 of the load traversing means 13. The motors for powering the carriage 55 and rail 56 may be energized in a manner opposite to motors 45 and 46 so that the counterweight moves in a direction opposite to that of the trolley 33 and the van 42.

Figures 9, 10:
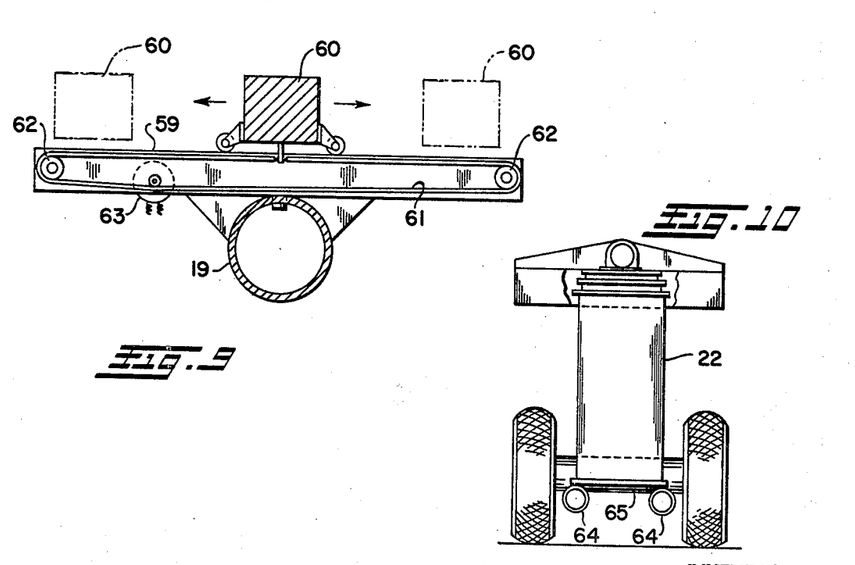
FIGURE 9 is a modification of my movable counterweight.
FIGURE 10 is a view similar to FIGURE 8 showing a modification of my van handler.

In FIGURE 9 of the drawings, I illustrate a modification of the movable counterweight wherein the lower longitudinal beam 19 immediately adjacent each of the load lifting mechanisms 11 is provided with a fixed rail 59 and a suitable weight 60 is provided with depending wheels which ride on the fixed rail 59. A flexible chain 61 is connected to the weight 60 and reaved about the pulleys 62. Flexible chain 61 is driven by a suitable motor 63 which is reversible and may thus drive the counterweight in opposed directions opposite to the direction of movement of the trolley 33.

In FIGURE 10 of the drawings I illustrate a modification of my van handler truck in which the chassis 10 is provided with a pair of lower longitudinal beams 64 of smaller diameter than the lower longitudinal beam 19 so that the clearance of the vehicle is reduced.

Figure 8:
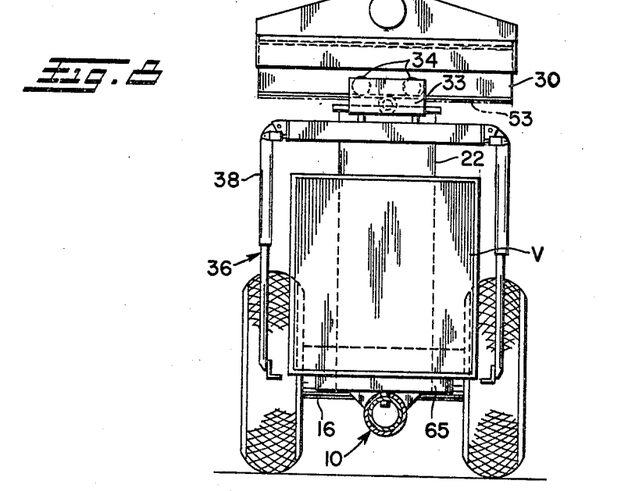
FIGURE 8 is a sectional view taken along the lines 8—8 of FIGURE 5 showing the position of a van resting on the chassis of my van handler truck.

In order to relieve excessive strain on the lifting means 11, particularly when a van is to be moved a relatively long distance, I mount two or more van supports 65 on the lower beams 19 and 64 preferably inwardly of the counterweights 54 and 60 respectively. Thus, after a van has been positioned within the confines of the chassis 10, it may be lowered so that the van rests on the supports 65.

Figure 2:
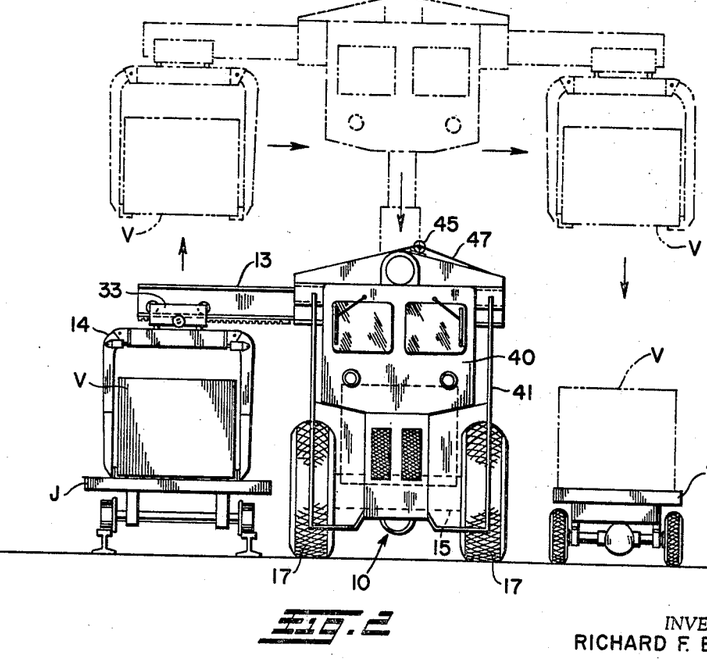
FIGURE 2 is a front elevational view of my van handler schematically showing its operation.
Figure 3:
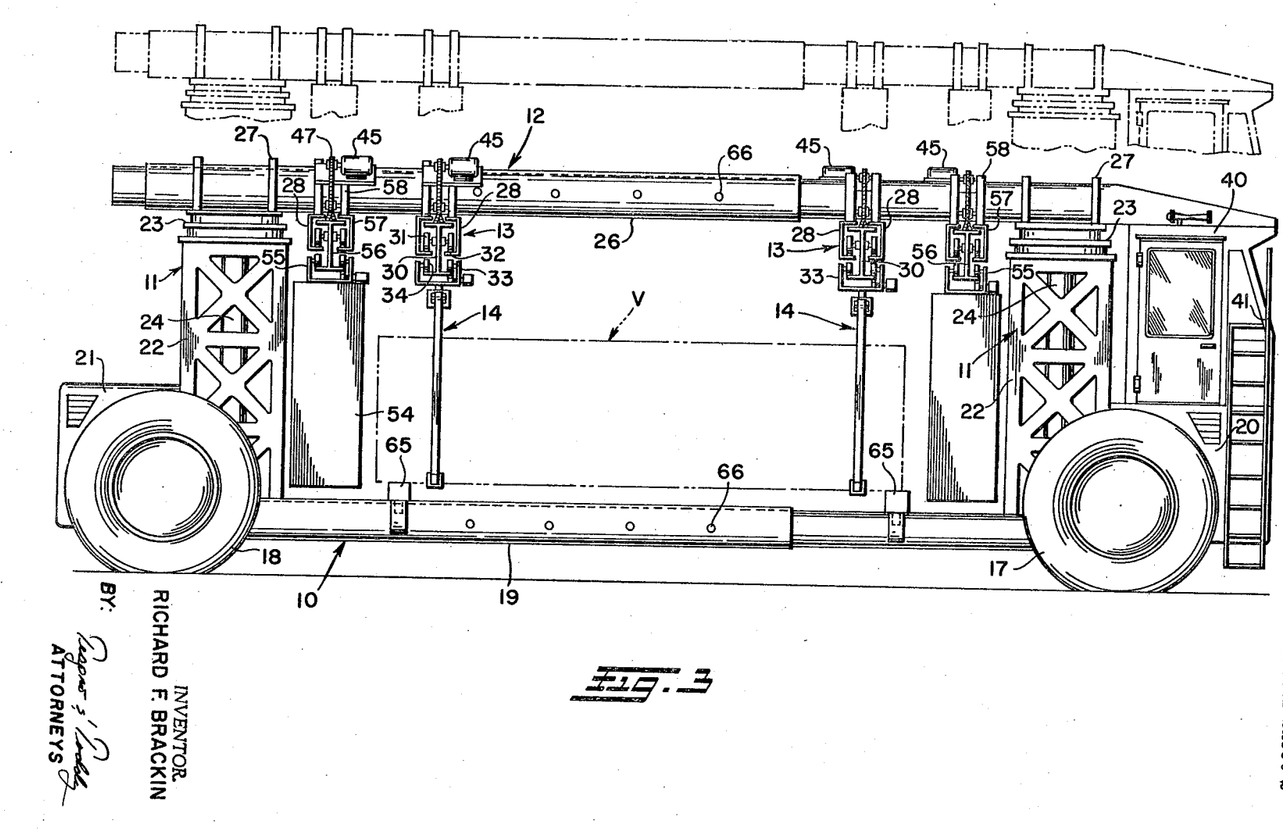
FIGURE 3 is a side elevational view of my van handler.

As a further feature of my invention both the lower and upper longitudinal beams 19 and 26 may be constructed of telescoping parts as clearly illustrated in FIGURES 2 and 3 so that the wheel base of the vehicle may be adjusted to accommodate vans or containers V of various longitudinal dimensions. A series of longitudinally spaced dimension holes may be provided in the inner telescoping portion and a single hole in the outer telescoping portion of the longitudinal beams. A suitable pin 66 is inserted through the aligned holes when the telescoping portions are in proper alignment to effect the adjustment.

Figure 1:
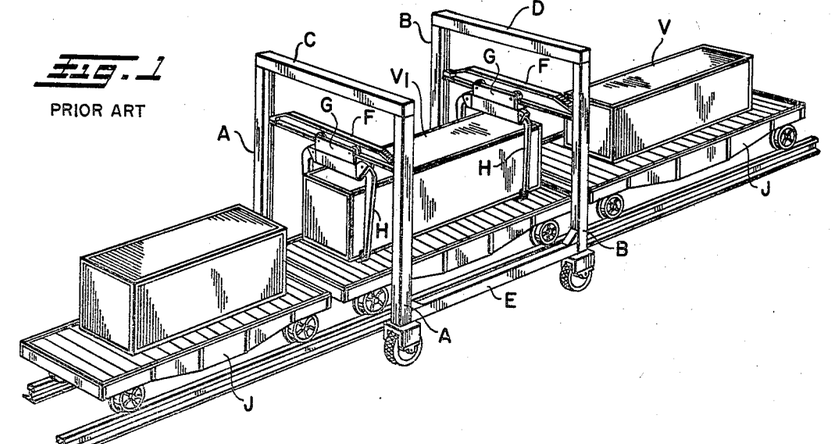
FIGURE 1 shows a conventional straddle truck in straddling relationship to a series of flat cars each carrying a van or container.

In order to appreciate the contribution of my invention, let us consider the construction and operation of a conventional straddle truck as illustrated in FIGURE 1. Such conventional trucks comprise two pairs of columns or stanchions A and B at each end of the truck all of which are supported by a wheel. The pair of stanchions A are connected by a cross beam C and the stanchions B are connected by a cross beam D. The stanchions A and B at one side of the truck are also connected by one or more longitudinal beams E. A cross rail F is mounted for vertical movement on each of the pairs of stanchions A and B which supports a trolley G having suitable van engaging means H. It is to be noted that the rails F lie in the same plane as the pairs of stanchions A and B respectively, and at each side of the truck the stanchions A, B and longitudinal beam E lie in the same plane. Due to the very nature of the construction the conventional straddle truck must lift a load only by approaching one end of the load and moving over it. For purposes of illustration in FIGURE 1, let us assume that a series of flat cars J each have a van V positioned thereon and the conventional truck is to be used to unload the van $V_1$. It it necessary for the straddle truck to straddle the end railway car and move into a position in straddling relationship to the van $V_1$, lift the van $V_1$ above the next van V and move longitudinally beyond the first car to carry the van $V_1$ to a position where it is deposited. Because the van is held elevated by the trolleys G rather than deposited on a part of the truck, a great strain is naturally placed on the lifting mechanism and therefore, the speed of movement of the straddle truck must necessarily be rather slow in order not to damage the van or the lifting mechanism. It is further noted that although the trolley G may move transversely a limited degree such movement is restricted to the confines of the area defined by each of the columns A and B. In other words, the van may not be moved transversely outside of such area.

My van handler overcomes all of the foregoing disadvantages of the conventional straddle truck. Let us assume that containers V are positioned upon a series of flat cars J and it is desired to remove a van V from the flat car to an over-the-road truck-trailer T. My van handler may be moved to the side of the flat car and the load engaging means 14 lowered into engagement with the van. The lifting mechanism 11 is then actuated to move the lifting mechanism 11 and mounting means 12 into an elevated position as shown in FIGURE 2. The traversing means 13 is then actuated to move the carriage and van in the direction of the horizontal arrows shown in FIGURE 2 to a position at the opposite side of my van handler. The lifting mechanism 11 is then lowered so that the van V is deposited on the truck-trailer T. In the event that the van is to be moved to a stacking area or deposited on an elevated ship deck or fixed elevated dock, it is apparent that the van V after removal from the flat car J may be lowered into a central position as shown in FIGURE 3 to relieve strain from the mechanism. The van handler is then moved to the elevated deck of a ship or dock, raised a sufficient height. The traversing mechanism 13 then actuated to deposit the load on the elevated deck of the ship or the elevated fixed dock.

Of course, my van handler when transporting a van may be moved at comparatively high speed without fear of damaging the van or lifting mechanism since the van may be lowered on supports 65.

I believe that the operation of my extremely novel van handler will now be understood and that its advantages appreciated by those skilled in the art.

I now claim:

1. In a vehicle of the class described, a wheeled chassis, load engaging means for engaging a load such as a van for lifting and lowering the load, mounting means fixed to each end of said chassis, traversing means supported on said mounting means above said chassis and mounting said load engaging means for movement transversely to one side or the other of said chassis to position said load engaging means over a load positioned outside said chassis and resting on the ground or on a support at one side or the other of said chassis, means for moving said load engaging means on said traversing means for moving said load engaging means and an accepted load bodily from one side of said chassis to the other side, and power means fixed to said chassis for lifting and lowering said mounting means together with said load engaging means and said traversing means relatively to said chassis to bring the load engaging means into engagement with a load and thereafter to lift and lower said mounting means, said traversing means and said load engaging means together with said load as a unit whereby to minimize the distance between the top of the load and the topmost element of the mounting means, the traversing means or the load engaging means.

2. In the combination of claim 1, the feature that said mounting means and said traversing means are mounted for linear vertical movement by said power means relatively to said chassis.

3. In the combination of claim 1, the feature that said traversing means includes a trolley in turn mounted for movement on a beam, and said mounting means mounting said beam for movement transversely of the longitudinal axis of said chassis from a central position relatively to said chassis to a position extending said beam over one side or the other side of said chassis.

4. In the combination of claim 1, the feature that said means for lifting and lowering said mounting means and traversing means comprise at least one ram at each end of said van handling vehicle.

5. In the combination of claim 4, the feature that each of said rams in vertically positioned and its piston has secured thereto a part of said mounting means.

6. In the combination of claim 3, the feature that said beam is substantially the same length as the width of said chassis whereby not to obstruct movement of said chassis between two obstructing bodies such as vans positioned at each side of said chassis.

7. In the combination of claim 2, the feature that said linear movement is contributed by a vertically positioned hydraulic ram at each end of the vehicle.

8. In the combination of claim 7, the feature that said mounting means include a longitudinal beam or the like supported at its opposed ends by said rams.

9. In the combination of claim 1, the feature that when said load is moved from one side of said chassis to the other side of said chassis, the path of movement brings the load over the area defined by said chassis so that the load may be deposited on said area.

10. In the combination of claim 1, the feature that said traversing means include a transverse beam at each end of said chassis and means supporting each beam for movement transversely of said chassis to position said load engaging means to accept a load at each side of said chassis.

11. In the combination of claim 1, the feature that counterweights are mounted on said chassis for movement in directions opposite to the movement of said load engaging means to counterbalance the weight of a load accepted by said load engaging means.

12. In the combination of claim 1, the feature that said chassis supports thereon a longitudinal beam or the like functioning as a counterweight, and means for moving said beam from a central position in alignment with the longitudinal axis of said chassis to a position in alignment with one or the other longitudinal sides of said chassis.

13. In the combination of claim 1, the feature that said chassis has support means on which said load may be lowered for support and for transportation with said chassis when said load is shifted by said engaging means relatively to said mounting means into straddled position within said chassis and there lowered for acceptance by said support means.

14. In a vehicle of the class described, a wheeled chassis, a power load lifting mechanism at each of the longitudinal ends of said chassis, a load lifting member extending longitudinally of said chassis and secured at each of its opposed ends to one of said power load lifting mechanisms, a pair of load supporting members, means on said load lifting member mounting each of said load supporting members for movement transversely of said chassis, load engaging means for engaging a load such as a van, and means mounting one of said load engaging members for sliding movement transversely of said chassis on each of said load supporting members.

15. In the combination of claim 14, the feature that each of said power load lifting mechanisms is a vertically positioned hydraulic ram, each of said load supporting members is a trolley supporting beam and each of said load engaging members includes a trolley mounted on one of said beams.

16. In the combination of claim 18, the feature that said chassis is formed by a separable wheel supported front end section and a separable wheel supported rear end section, means securing said front and rear end sections in adjusted spaced positions, and parts of said load engaging means, said shifting means and said power means supported on each of said sections and extending toward one another for assembly in adjusted spaced position in accordance with the spacing of said sections.

17. In the combination of claim 16, the feature that said means securing said front and rear sections are telescopic.

18. In a truck of the class described, a load straddling chassis having ground wheels at each side of its longitudinal axis for transporting a straddled load, means for engaging said load, shifting means for shifting said means for engaging said load transversely to one side or the other of the longitudinal axis of said truck chassis and beyond the wheels at one side or the other and also into a central position within the truck and between the wheels, and power means for imparting linear vertical movement to said load engaging means together with said shifting means whereby a load may be engaged and elevated from a ground position at one side of said truck and then shifted by said shifting means toward a straddled elevated position within said truck and then to an elevated position at the other side of said truck and then lowered by said power means to a position on the ground at the other side of said truck, said load straddling chassis being so constructed as not to obstruct said load shifting movement.

19. In the combination of claim 18, the feature that said shifting means are operative to shift the load transversely in all elevated positions to which they are moved by said power means.

20. In the combination of claim 18, the feature that said power means can lift and lower said shifting means and load engaging means in all transverse positions of said shifting means.

21. In the combination of claim 18, the feature that said shifting means are formed to shift the load in a linear line transversely of said truck.

References Cited

UNITED STATES PATENTS

| | | | |
|---|---|---|---|
| 2,773,614 | 12/1956 | Edwards et al. | 214—730 |
| 2,897,985 | 8/1959 | Carlson et al. | 214—75 |
| 2,916,172 | 12/1959 | Locke | 212—49 XR |
| 2,996,206 | 8/1961 | McKee. | |
| 3,031,091 | 4/1962 | Erickson et al. | 214—75 |
| 3,212,654 | 10/1965 | Dolphin. | |
| 3,338,436 | 8/1967 | Bowman-Shaw | 214—75 |

ROBERT G. SHERIDAN, Primary Examiner

U.S. Cl. X.R.

212—74; 214—75, 127, 658, 730